INVENTOR.
GEORGE BLASSE
BY
Agent

United States Patent Office 3,595,802
Patented July 27, 1971

3,595,802
DIVALENT EUROPIUM ACTIVATED BARIUM-STRONTIUM ALUMINATE LUMINESCENT MATERIAL
George Blasse, Emmasingel, Eindhoven, Netherlands, assignor to U.S. Philips Corporation, New York, N.Y.
Filed Dec. 9, 1968, Ser. No. 782,277
Claims priority, application Netherlands, Dec. 12, 1967, 6716848
Int. Cl. C09k 1/66
U.S. Cl. 252—301.4R     3 Claims

ABSTRACT OF THE DISCLOSURE

Bivalent europium activated barium or barium-strontium luminescent aluminate useful in mercury vapor lamps.

This invention relates to a novel luminescent alkaline earth aluminate activated by bivalent europium and to a low-pressure mercury vapor discharge lamp provided with such a luminescent aluminate.

Recent investigations have shown bivalent and trivalent europium to be very useful as activators in different basic latices. Thus it has been found that the trivalent europium in most basic latices gives rise to a red or orange luminescence when excited either by ultraviolet radiation or by electrons. Such luminescent substances are therefore frequently employed in cathode-ray tubes for displaying colored television images and in high-pressure mercury vapor discharge lamps for the completion of the radiation emitted by such lamps in the red part of the spectrum.

It is further known from U.S. patent specification No. 3,294,699 that europium in a bivalent form may serve as an activator in strontium aluminate and yields an emission in thhe green part of the spectrum having a maximum at 520 nm. when excited by ultraviolet radiation.

According to the invention it has been found that a novel luminescent material may be prepared by activating barium aluminate or barium strontium aluminate with bivalent europium.

More particularly, the bivalent europium activated luminescent alkaline earth aluminate of the invention corresponds to the formula

$$Ba_{x+0.2}Sr_yEu_pAl_2O_4$$

wherein $X+y+p=0.8$
and $0.001 \leq p \leq 0.10$

A luminescent material which is defined by the above formula may satisfactorily be excited by short-wave and long-wave ultraviolet radiation and even by blue visible radiation. If in the formula $y$ is chosen to be $o$ the pure barium aluminate, activated by bivalent europium,

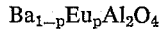

$$Ba_{1-p}Eu_pAl_2O_4$$

is obtained. This substance has its maximum emission at a wavelength of 500 nm. The maximum emission shifts to slightly longer wavelengths as the strontium content increases.

The value of $p$ may be varied within the limits mentioned above, but is preferably chosen to be between 0.003 and 0.03. In fact, in this range the highest radiation efficiency is obtained as will be shown below.

The luminescent aluminates according to the invention have a light output which is at least as high as that of the known strontium aluminate activated by bivalent europium. An advantage relative to the said strontium aluminate resides in the fact that the luminescent aluminates according to the invention are cheaper. In fact, the specific weight of barium is higher than that of strontium and consequently a smaller quantity of the expensive element europium is required to obtain the same activator content when preparing the luminescent substances according to the invention.

A luminescent material of the invention is eminently suitable for use in low-pressure mercury vapor discharge lamps due to the high light output of the luminescent material and due to the location of the emission in the spectrum. In fact, the aluminates according to the invention emit at shorter wavelengths than the known strontium aluminate and their emission spectrum is consequently better adapted to the emission lines of the mercury vapor discharge.

The most important advantage of the luminescent substances according to the invention is that they can be excited by shortwave blue radiation. As is known, it is desired to suppress the intensity as much as possible of the blue radiation of the mercury vapor discharge lamps in low pressure mercury vapor discharge lamps having a good color reproduction, particularly in lamps having a low color temperature. Up till now this had often been achieved by addition of a blue absorbing pigment usually in the form of a separate layer. This of course results in a loss of efficiency. It is also possible to use luminescent substances which are excited by blue radiation. Until now, only the manganese-activated magnesium arsenate has been used in practice for this purpose. This substance has an emission located in the red part of the spectrum. This may have a favorable effect in those cases where a certain share of red radiation is desired; however, the lumen equivalent of the radiation of the magnesium arsenate is low. On the other hand, the aluminates according to the invention absorb the undesired radiation and convert it partly into blue green radiation having a high lumen equivalent. If lamps are desired having a high red content, one has more choices than when using the said arsenate. For example, a compound such as yttrium vanadate activated by trivalent europium can be used which relative to magnesium arsenate emits radiation having a considerably higher lumen equivalent.

The luminescent substances according to the invention have the further property that they are resistant to oxidation. When manufacturing low-pressure mercury vapor discharge lamps, it is necessary to bring the luminescent screen to a high temperature, for example, for removing a temporary binder. It is then important that the luminescent properties are not lost due to oxidation possibly occurring.

The invention will now further be described in greater detail with reference to the following tables, example and drawing:

TABLE I

| I | II | III | IV | V | VI | VII | VIII |
|---|---|---|---|---|---|---|---|
| | | Firing mixture | | | | | |
| Example | Formula | Compounds | Grams | $\lambda_{max.}$ in nm. | $q$ in percent | $r$ in percent | r.l.o. |
| 1 | $Ba_{0.99}Eu_{0.01}Al_2O_4$ | $BaCO_3$ | 1.960 | 500 | 60 | 25 | 45 |
| | | $Eu_2O_3$ | 0.018 | | | | |
| | | $Al(OH)_3$ | 1.560 | | | | |
| 2 | $Ba_{0.98}Eu_{0.02}Al_2O_4$ | $BaCO_3$ | 1.940 | 500 | 50 | 18 | 41 |
| | | $Eu_2O_3$ | 0.036 | | | | |
| | | $Al(OH)_3$ | 1.560 | | | | |
| 3 | $Ba_{0.49}Sr_{0.49}Eu_{0.02}Al_2O_4$ | $BaCO_3$ | 0.970 | 510 | 50 | 17 | 41 |
| | | $SrCO_3$ | 0.720 | | | | |
| | | $Eu_2O_3$ | 0.036 | | | | |
| | | $Al(OH)_3$ | 1.560 | | | | |
| 4 | $Ba_{0.20}Sr_{0.78}Eu_{0.02}Al_2O_4$ | $BaCO_3$ | 0.388 | 518 | 45 | 17 | 37 |
| | | $SrCO_3$ | 1.150 | | | | |
| | | $Eu_2O_3$ | 0.036 | | | | |
| | | $Al(OH)_3$ | 1.560 | | | | |

EXAMPLE

A mixture was made of the substances indicated in column III of Table I in the quantities indicated in column IV. This mixture was heated at 1050–1200° C. for 2 hours. After cooling of the firing product obtained, it was ground and again heated at 1250–1400° C. for 2 hours. The heat treatment took place in both cases in a mixture of nitrogen and hydrogen. The ratio of nitrogen and hydrogen then is not critical; a ratio of, for example, 20:1 was found to be very well usable. The hydrogen serves for the reduction of the trivalent europium into bivalent europium. After cooling subsequent to the second heat treatment, the reaction product obtained was ground and sieved, if necessary. It was then ready for use.

Column VI of Table I states the quantum efficiency $q$ in percents. The percentages shown indicate the conversion efficiencies of the conversion of the absorbed exciting quantums. To obtain a measure of the light output of the luminescent substances, the quantum efficiency is still to be multiplied by the absorption factor. The absorption factor is supposed to be equal to $100-r$, wherein $r$ represents the reflection factor (in percent).

The reflection factor is shown in percents in column VII. The relative light output (r.l.o.) of the luminescent substance as mentioned in column VIII is then found from the equation:

$$\text{r.l.o.} = q \cdot \frac{100-r}{100}$$

Column V states the wavelength in nm. of the maximum of the emission band for the different substances. All measurements were carried out on excitation by radiation having a wavelength of 254 nm.

TABLE II

| Eu-content, $p$ | $q$ in percent | $r$ in percent | r.l.o. |
|---|---|---|---|
| 0.005 | 60 | 40 | 36 |
| 0.01 | 60 | 25 | 45 |
| 0.02 | 50 | 18 | 41 |
| 0.03 | 20 | 15 | 17 |
| 0.07 | 14 | 10 | 12 |
| 0.15 | 6 | 7 | 6 |

In Table II the dependence of the quantum efficiency, the reflection and the relative light output of the europium content is indicated for the compound defined by the formula $Ba_{1-p}Eu_pAl_2O_4$ (all measurements on excitation by radiation having a wavelength of 254 nm.). At increasing europium content the relative light output is found to be first increasing and then decreasing. The reflection becomes smaller and hence the absorption becomes greater at increasing $p$. At values of $p<0.001$ substances are obtained which are no longer usable in practice. Substances having the highest relative light outputs have values of $p$ between 0.003 and 0.03. The spectral distribution of the emitted radiation is substantially independent of the europium content.

In the drawing:

FIG. 1 diagrammatically shows partially in cross section a low-pressure mercury vapor discharge lamp employing a luminescent material according to the invention;

Figure 1:
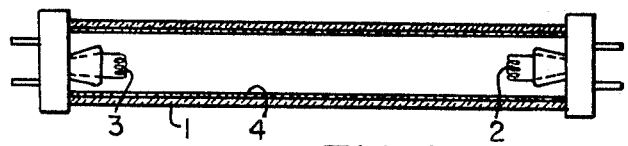

In FIG. 1 a low pressure mercury vapor discharge lamp having a wall 1 is provided with electrodes 2 and 3 at the ends of the lamp. The inner side of the wall 1 which consists, for example, of glass, is coated with a luminescent layer 4 comprising a luminescent substance according to the invention. The luminescent substance is provided on the wall 1 in one of the many conventional manners, for example by applying a suspension of the luminescent material in a suitable medium such as nitrocellulose in amylacetate and then drying and heating the applied layer to drive off the amylacetate and nitrocellulose.

Figure 2:
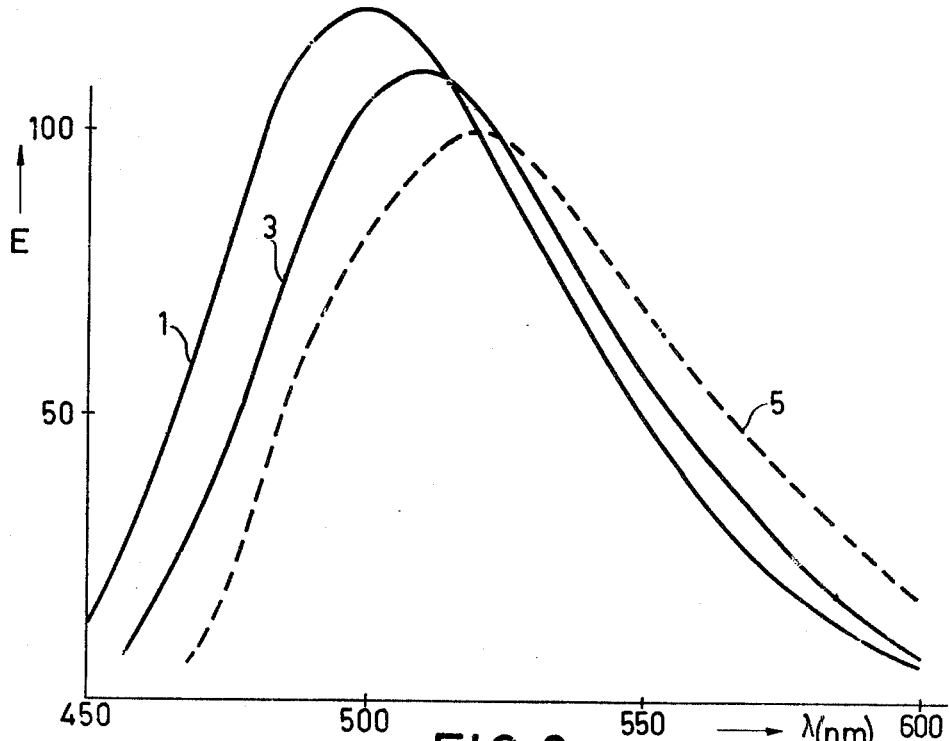
FIG. 2 is a graphic representation of the radiation intensities of the substances according to the Examples 1 and 3 of Table I as a function of the wavelength.

The wavelength is plotted in nm. on the abscissa of the graph in FIG. 2. The radiation intensity is plotted in arbitrary units on the ordinate. The curves 1 and 3 show the spectral distribution of the emission of the substances according to the Examples 1 and 3 of Table I upon excitation by radiation having a wavelength of 254 nm. For comparison the broken-line curve 5 is included which shows the spectral energy distribution of the known strontium aluminate activated by bivalent europium. The maximum intensity of the curve 5 is fixed at 100.

Figure 3:
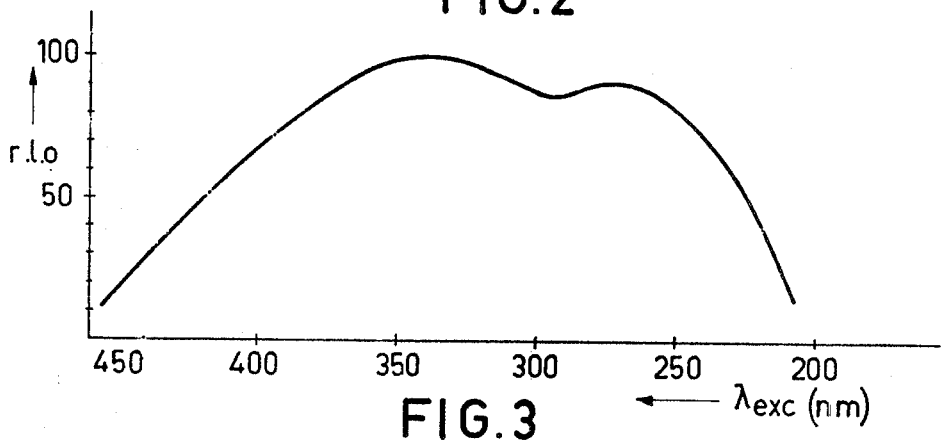
FIG. 3 shows the excitation spectrum of a luminescent substance according to the invention.

The graph of FIG. 3 shows the excitation spectrum of the luminescent substances according to the invention. The relative light output is plotted in the graph as a function of the wavelength of the exciting radiation, the maximum light output being fixed at 100. It is clearly found that the luminescent substances according to the invention are satisfactorily excited both by short-wave and by long-wave ultraviolet radiation. It is also found that a considerable excitation by blue visible radiation takes place.

While I have described my invention in connection with specific embodiments and applications, other modifications thereof will be readily apparent to those skilled in this art without departing from the spirit and scope of the invention as defined in the appended claims.

What I claim is:

1. A luminescent alkaline earth aluminate activated by bivalent europium, said luminescent aluminate corresponding to the formula $$Ba_{x+0.2}Sr_yEu_pAl_2O_4$$

wherein $x+y+p=0.8$ and $0.001 \leq p \leq 0.10$.

2. The luminescent aluminate of claim 1 which corresponds to the formula $$Ba_{1-p}Eu_pAl_2O_4$$

wherein $0.001 \leq p \leq 0.10$.

3. The luminescent aluminate of claim 1 wherein $0.003 \leq p \leq 0.03$.

References Cited

UNITED STATES PATENTS

| | | | |
|---|---|---|---|
| 3,294,699 | 12/1966 | Lange | 252—301.4 |
| 3,448,056 | 6/1969 | Chenot | 252—301.4 |

ROBERT D. EDMONDS, Primary Examiner